United States Patent
Uchida et al.

(10) Patent No.: US 8,318,125 B2
(45) Date of Patent: Nov. 27, 2012

(54) METHOD FOR ACTIVATING CATALYST FOR CHLORINE PRODUCTION

(75) Inventors: Youhei Uchida, Niihama (JP); Kohei Seki, Niihama (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 13/362,053

(22) Filed: Jan. 31, 2012

(65) Prior Publication Data

US 2012/0128575 A1 May 24, 2012

Related U.S. Application Data

(62) Division of application No. 12/669,757, filed as application No. PCT/JP2008/063462 on Jul. 18, 2008, now abandoned.

(30) Foreign Application Priority Data

Jul. 23, 2007 (JP) .................... 2007-190523

(51) Int. Cl.
- *C01B 7/00* (2006.01)
- *B01J 38/12* (2006.01)
- *B01J 38/10* (2006.01)
- *B01J 38/06* (2006.01)

(52) U.S. Cl. ............ 423/502; 502/38; 502/53; 502/55

(58) Field of Classification Search .......... 502/22, 502/34, 38, 53, 55, 325; 423/502
See application file for complete search history.

(56) References Cited

U.S. PATENT DOCUMENTS

| | | | |
|---|---|---|---|
| 2,451,870 A | 10/1948 | Richardson et al. | |
| 2,602,021 A | 7/1952 | Belchetz | |
| 3,006,732 A | 10/1961 | Baumgartner et al. | |
| 3,694,376 A | 9/1972 | Kabisch et al. | |
| 4,107,280 A | 8/1978 | Rohrmann | |
| 4,729,981 A | 3/1988 | Kobylinski et al. | |
| 4,738,948 A | 4/1988 | Iglesia et al. | |
| 5,084,264 A | 1/1992 | Lyke | |
| 5,093,292 A | 3/1992 | Yoshikawa et al. | |
| 5,154,911 A | 10/1992 | Benson et al. | |
| 5,763,348 A * | 6/1998 | Fung et al. | 502/37 |
| 5,837,636 A | 11/1998 | Sechrist et al. | |
| 5,908,607 A | 6/1999 | Abekawa et al. | |
| 6,475,943 B1 | 11/2002 | Hoek et al. | |
| 2002/0028173 A1 | 3/2002 | Hibi et al. | |
| 2003/0144366 A1 | 7/2003 | Daage et al. | |
| 2006/0263290 A1 | 11/2006 | Walsdorff et al. | |

FOREIGN PATENT DOCUMENTS

| | | |
|---|---|---|
| DE | 102005061954 A1 | 7/2007 |
| JP | 62-256930 | 11/1987 |
| JP | 2007-175700 | 7/2007 |
| WO | WO 0110550 A1 | 2/2001 |
| WO | WO 2007074129 A1 * | 7/2007 |

OTHER PUBLICATIONS

Extended European Search Report issued Jul. 25, 2011, in European Patent Application No. 08791701.9.
Machine Translation of JP 2007-175700. Published Jul. 12, 2007.

* cited by examiner

*Primary Examiner* — Colleen Dunn
*Assistant Examiner* — Anthony J Zimmer
(74) *Attorney, Agent, or Firm* — Sughrue Mion, PLLC

(57) ABSTRACT

A catalyst having decreased activity is subjected to a contact treatment with a reducing gas containing carbon monoxide and/or hydrogen. Also, the catalyst can be effectively activated by being treated by contacting with an oxidizing gas after having been treated by contacting with the reducing gas. As the catalyst for production of chlorine, a ruthenium catalyst, particularly a catalyst containing ruthenium oxide is suitably activated.

6 Claims, No Drawings

METHOD FOR ACTIVATING CATALYST FOR CHLORINE PRODUCTION

CROSS REFERENCE TO RELATED APPLICATIONS

This application is a divisional of pending U.S. application Ser. No. 12/669,757, filed Jan. 19, 2010, which is a National Stage of International Application No. PCT/JP2008/063462 filed Jul. 18, 2008, claiming priority based on Japanese Patent Application No. 2007-190523, filed Jul. 23, 2007, the contents of all of which are incorporated herein by reference in their entirety.

TECHNICAL FIELD

The present invention relates to a method for activating a catalyst for use in the production process of chlorine, which production process comprises oxidizing hydrogen chloride with oxygen. The present invention also relates to a method for producing chlorine by oxidizing hydrogen chloride with oxygen using the catalyst activated by the method.

BACKGROUND ART

With respect to a method for activating a catalyst for producing chlorine by oxidizing hydrogen chloride with oxygen, Japanese Unexamined Patent Publication No. 2007-7521 discloses a method for activating a catalyst having decreased activity by bringing the catalyst into contact with a gas substantially composed only of oxygen and/or an inert gas.

DISCLOSURE OF THE INVENTION

However, the activity of the catalyst having decreased activity could not have necessarily been recovered sufficiently by the method described in the above document.

An object of the present invention is to provide a method which can effectively recover the activity of a catalyst having decreased activity.

The present invention provides a method for activating a catalyst for use in the production process of chlorine, which process comprises oxidizing hydrogen chloride with oxygen, characterized in that a catalyst having decreased activity is treated by contacting with a reducing gas containing carbon monoxide and/or hydrogen.

The present invention also provides a method for producing chlorine by oxidizing hydrogen chloride with oxygen in the presence of the catalyst activated by the above method.

According to the activation method of the present invention, the activity of a catalyst having decreased activity can be recovered, and chlorine can be produced cost-effectively by reusing the catalyst activated by the present method.

BEST MODE FOR CARRYING OUT THE INVENTION

The catalyst to be subjected to the activation treatment in the present invention is a catalyst for use in the production of chlorine, which process comprises oxidizing hydrogen chloride with oxygen (hereinafter said catalyst merely referred to as catalyst). The catalyst includes, for example, a copper catalyst, a chromium catalyst and a ruthenium catalyst.

Suitable examples of the copper catalyst include a catalyst generally referred to as Dracon catalysts, comprising various compound(s), as a third component, in addition to copper chloride and potassium chloride. Suitable examples of the chromium catalyst include catalysts containing chromium oxide disclosed in Japanese Unexamined Patent Publication No. 61-136902, Japanese Unexamined Patent Publication No. 61-275104, Japanese Unexamined Patent Publication No. 62-113701 and Japanese Unexamined Patent Publication No. 62-270405. Suitable examples of the ruthenium catalyst include catalysts containing ruthenium oxide disclosed in Japanese Unexamined Patent Publication No. 9-67103, Japanese Unexamined Patent Publication No. 10-338502, Japanese Unexamined Patent Publication No. 2000-281314, Japanese Unexamined Patent Publication No. 2002-79093 and Japanese Unexamined Patent Publication No. 2002-292279.

The method of the present invention is suitably used for the ruthenium catalyst, particularly the catalyst containing ruthenium oxide. The catalyst containing ruthenium oxide may be, for example, a catalyst composed substantially only of ruthenium oxide, or a supported ruthenium oxide in which ruthenium oxide is supported on a carrier such as alumina, titania, silica, zirconia, niobium oxide or activated carbon, or a complex oxide composed of ruthenium oxide and other oxides, such as alumina, titania, silica, zirconia and niobium oxide.

The production of chlorine using the catalyst described above is usually performed by a continuous method under vapor phase conditions while feeding hydrogen chloride and oxygen in a fixed bed reactor filled with a catalyst or a fluidized bed reactor in which the catalyst is fluidized. In this case, it is advantageous to supply steam, in addition to hydrogen chloride and oxygen, as disclosed in, for example, Japanese Unexamined Patent Publication No. 2001-19405 since the temperature distribution of a catalyst layer can be made uniform.

The reaction temperature is usually from 100 to 500° C., and preferably from 200 to 400° C., while the reaction pressure is usually from about 0.1 to 5 MPa. As an oxygen source, air may be used, or pure oxygen may be used. In order to completely oxidize hydrogen chloride to chlorine, oxygen is theoretically required in an amount of ¼ mol per mol of hydrogen chloride. Usually, oxygen is used in an amount of 0.1 to 10 times larger than that of the theoretical amount. The feed rate of hydrogen chloride is usually from about 10 to about 20,000 $h^{-1}$ in terms of a volume feed rate (as converted at 0° C. and 1 atm) of the gas per volume of catalyst layer, namely, GHSV.

Examples of the hydrogen chloride-containing gas which can be used as a hydrogen chloride source include a gas produced by the reaction of hydrogen and chlorine, a gas generated by heating hydrochloric acid, various by-product gasses generated by a thermal decomposition reaction or combustion reaction of a chlorine compound, a carbonylation reaction of an organic compound using phosgene, a chlorination reaction of an organic compound using chlorine and production of chlorofluoroalkane, and flue gases generated from an incinerator.

Herein, the thermal decomposition reaction of a chlorine compound includes, for example, a reaction in which vinyl chloride is produced from 1,2-dichloroethane and a reaction in which tetrafluoroethylene is produced from chlorodifluoromethane; the carbonylation reaction of an organic compound using phosgene includes, for example, a reaction in which isocyanate is produced from amine, and a reaction in which a carbonate ester is produced from a hydroxy compound; and the chlorination reaction of an organic compound using chlorine includes, for example, a reaction in which allyl chloride is produced from propylene, a reaction in which ethyl chloride is produced from ethane and a reaction in which chlorobenzene is produced from benzene. The production of chlorofluoroalkane includes, for example, production of dichlorodifluoromethane and trichloromonofluoromethane by the reaction of carbon tetrachloride and hydrogen fluoride, and production of dichlorodifluoromethane and trichloromonofluoromethane by the reaction of methane, chlorine and hydrogen fluoride.

In the oxidization reaction, with the lapse of operation time, namely, with a lapse of use time of catalyst, the activity of the catalyst gradually decreases. An unexpected decrease in catalytic activity can be caused by operating error during operation and trouble of equipment. For example, when it becomes difficult to control the reaction temperature and thus the catalyst is exposed to high temperature for a long time, or feed of oxygen is stopped and thus the catalyst is contacted with hydrogen chloride for a long time in the absence of oxygen, the activity of the catalyst may decease. Furthermore, also when initiation of feed of oxygen is delayed upon starting up or stop of feed of hydrogen chloride is delayed upon temporary stop of the reaction and thus the catalyst is contacted with hydrogen chloride for a long time in the absence of oxygen, the activity of the catalyst may decrease. After a gas produced by the above oxidation reaction is washed and dehydrated with concentrated sulfuric acid, chlorine is separated, and then the remaining gas (residual gas) may be recovered as a raw material, and used again for the above oxidation reaction, however, the catalytic activity may decrease when the residual gas contains a sulfur component. Furthermore, hydrogen chloride generated as a by-product when amine is reacted with phosgene to produce isocyanate may contain impurities such as carbonyl sulfide derived from phosgene, hydrogen sulfide, carbon disulfide and sulfur oxide. When such hydrogen chloride is used as a raw material for the oxidation reaction, the catalytic activity may decrease. Therefore, in the present invention, a contact treatment with a reducing gas containing carbon monoxide and/or hydrogen is performed so as to recover the activity of a catalyst having decreased activity. The present invention is suitably employed for a catalyst whose activity is decreased as a result of using hydrogen chloride containing a sulfur component as a raw material for the oxidation reaction, among catalysts having decreased activity.

The reducing gas containing carbon monoxide and/or hydrogen may be a gas composed only of carbon monoxide, a gas composed only of hydrogen, or a mixture of gases of carbon monoxide and hydrogen. The reducing gas may contain an inert gas in addition to these gases. The inert gas as used herein is a neutral component which substantially does not exhibit neither oxidizability nor reducibility to catalyst, and does not also substantially exhibits neither acidity nor basicity, and examples thereof include steam, nitrogen, argon, helium and carbon dioxide. If necessary, a mixture of two or more kinds of them can also be used. As the inert gas, nitrogen is preferably used.

The concentration of carbon monoxide and/or hydrogen in the reducing gas is usually from 0.1 to 100% by volume, and preferably from 1 to 20% by volume. When the concentration is low, it takes a long time for activation of catalyst.

The temperature at which a catalyst having decreased activity is treated by contacting with the reducing gas, namely, the temperature of the contact treatment with the reducing gas is usually from 100 to 500° C., and preferably from 150 to 450° C. When the temperature is too low, it takes a long time for activation of catalyst. In contrast, when the temperature is too high, a catalyst component is likely to be vaporized. The pressure at which the contact treatment with the reducing gas is performed is usually from 0.01 to 3 MPa, and preferably from 0.1 to 1 MPa. The contact treatment with the reducing gas may be performed by a fixed bed method or a fluidized bed method. The feed rate of the reducing gas is usually from about 1 to about 100,000 h$^{-1}$ in terms of a volume feed rate (as converted at 0° C. and 1 atm) of the gas per volume of a catalyst layer, namely, GHSV. The time of the contact treatment with the reducing gas is usually from about 0.5 to about 100 hours.

When the catalyst having decreased activity is brought into contact with the reducing gas and then treated by contacting with an oxidizing gas, the catalyst can be activated more effectively. Said oxidizing gas is a gas containing an oxidizing substance and typically includes an oxygen-containing gas. As an oxygen source, air and pure oxygen are usually used and can be diluted with the inert gas described above, if necessary. As the inert gas, nitrogen is preferably used.

When the oxidizing gas is an oxygen-containing gas, the oxygen concentration in the gas is usually from 0.1 to 100% by volume, and preferably from 10 to 100% by volume.

The temperature of the contact treatment with the oxidizing gas is usually from 200 to 500° C., and preferably from 250 to 450° C. When the temperature is too low, it takes a long time for activation of catalyst. When the temperature is too high, a catalyst component is readily vaporized. The pressure at which the contact treatment with the oxidizing is performed is usually from 0.1 to 3 MPa, and preferably from 0.1 to 1 MPa. The contact treatment with the oxidizing gas may be performed by a fixed bed method or a fluidized bed method. The feed rate of the oxidizing gas is usually from about 1 to 100,000 h$^{-1}$ in terms of a volume feed rate (calculated at 0° C. under 1 atmospheric pressure) of a gas per volume of a catalyst layer, namely, GHSV. The time of the contact treatment with the oxidizing gas is usually from about 0.5 to about 100 hours.

In the present invention, catalyst activation can be more effectively accomplished by (1) treating a catalyst having decreased activity by contacting with water, thereafter with the reducing gas, and then with the oxidizing gas; (2) treating a catalyst having decreased activity by contacting with the reducing gas, thereafter contacted with water, and then contacted with the oxidizing gas; or (3) treating a catalyst having decreased activity by contacting with the reducing gas, thereafter contacting with the oxidizing gas, and then contacted with water. Among these, the method of (1) is more preferred.

The water to be used in the contact treatment with water is preferably high-purity water, such as distilled water, ion-exchange water or ultrapure water. When water to be used contains a large amount of impurities, the activity of catalyst sometimes cannot be sufficiently activated as a result of adhesion of the impurities onto the catalyst. However, the presence of dissolved hydrogen chloride in the water for use does not cause problem.

The temperature of the contact treatment with water is usually from 0 to 100° C., and preferably from 10 to 90° C. When the temperature is too low, the catalyst sometimes cannot be sufficiently activated. The pressure at which the contact treatment with water is performed is usually from 0.1 to 1 MPa, and preferably atmospheric pressure. The contact treatment with water may be performed by a fixed bed method or a batch-wise method. When the contact treatment is performed by a fixed bed method, the feed rate of water is usually from about 0.01 to 100 h$^{-1}$ in terms of a volume feed rate (as converted at 0° C. and 1 atm) of a liquid per volume of catalyst, namely, LHSV. The time of the contact treatment is usually from about 0.5 to 100 hours. In the fixed bed method, water may be circulated. The amount of water used when the contact treatment is performed by a batch-wise method is usually from about 1 to 100 parts by weight based on 1 part by weight of the catalyst, and the time of the contact treatment is usually from about 0.5 to 120 hours. The number of the contact treatment is usually from about 1 to 10 times.

The catalyst thus activated can be reused for the reaction of oxidizing hydrogen chloride with oxygen. A cost of the catalyst can be reduced and chlorine can be produced cost-effectively by activating and reusing the catalyst in such a manner.

When the oxidation reaction is performed by the fixed bed method, an advantageously employed process comprises performing an oxidation reaction while feeding material gas including hydrogen chloride and oxygen in a reactor filled with a catalyst, stopping feed of the material gas when the activity of the catalyst is decreased to such extent that it becomes difficult to continue the operation, performing the activation treatment of the present invention while the reactor is filled with the catalyst, restarting feed of the material gases, performing the oxidation reaction, and optionally repeating these activation treatments and oxidation reactions. When the oxidation reaction is performed by the fluidized bed method, an advantageously employed process comprises continuously or intermittently extracting portion of a catalyst from a reactor while performing the oxidation reaction, activating the catalyst in a separate vessel, and returning the activated catalyst to the reactor, namely, process of circulating the catalyst between a reactor and a vessel for an activation treatment.

EXAMPLES

Examples of the present invention will be described below, but the present invention is not limited by these examples. In the examples, a feed rate (ml/min) of a gas is expressed by a value as converted at 0° C. and 1 atm unless otherwise specified.

Reference Example 1

(a) Preparation of Fresh Catalyst

50 Parts by weight of titanium oxide [STR-60R manufactured by Sakai Chemical Industry Co., Ltd., 100% rutile type], 100 parts by weight of α-alumina [AES-12 manufactured by Sumitomo Chemical Co., Ltd.], 13.2 parts by weight of a titania sole [CSB manufactured by Sakai Chemical Industry Co., Ltd., titania content: 38% by weight] and 2 parts by weight of methyl cellulose [Metolose 65SH-4000 manufactured by Shin-Etsu Chemical Co., Ltd.] were mixed and pure water was added, followed by kneading. The resultant mixture was extruded into a cylindrical body having a diameter of 3.0 mmφ, dried and then ground into pieces each having a length of 4 to 6 mm. The resultant shaped body was calcined in air at 800° C. for 3 hours to obtain a carrier including a mixture of titanium oxide and α-alumina. The carrier was impregnated with an aqueous solution of ruthenium chloride, dried and then calcined in air at 250° C. for 2 hours to obtain a bluish gray supported ruthenium oxide in which ruthenium oxide is supported on the carrier at a supporting ratio of about 2% by weight. The resultant supported ruthenium oxide (fresh catalyst) was analyzed by ICP spectrometry. As a result, the sulfur content was 0.02% by weight.

(b) Preparation of Catalyst Having Decreased Activity (Hereinafter Referred to as Deteriorated Catalyst)

A reactor was filled with the fresh catalyst obtained in Reference Example 1(a). Next, a deteriorated catalyst was prepared by performing an oxidation reaction while feeding a material gas including hydrogen chloride (containing 130 ppb by volume of a sulfur component) and oxygen in the reactor. The deteriorated catalyst was extracted and analyzed by ICP spectrometry. As a result, the sulfur content was 0.14% by weight.

Example 1

(a) Activation Treatment of Deteriorated Catalyst (Contact Treatment with Reducing Gas)

A nickel reaction tube having an inner diameter of 13 mm was filled with 1 g of the deteriorated catalyst of Reference Example 1(b) and then filled with 12 g of α-alumina spheres [SSA995 manufactured by NIKKATO CORPORATION] as a preheating layer at the gas inlet side of a catalyst layer. While feeding nitrogen gas at a rate of 80 ml/min, the reaction tube was immersed in a salt bath using a molten salt [potassium nitrate/sodium nitrite=1/1 (weight ratio)] as a heat medium, thereby adjusting the temperature of the catalyst layer to 350° C. Next, feed of the nitrogen gas was stopped, and carbon monoxide gas was fed at a rate of 3.2 ml/min (0.009 mol/h) and nitrogen gas was fed at a rate of 28.8 ml/min (0.08 mol/h) for 2 hours.

(b) Evaluation of Activated Catalyst

After the activation treatment (a), feed of the carbon monoxide gas was stopped and nitrogen gas was fed at a rate of 80 ml/min (0.21 mol/h), and then the temperature of the catalyst layer was adjusted within a range from 281 to 282° C. Next, feed of the nitrogen gas was stopped and an oxidation reaction was performed at a catalyst layer temperature of 281 to 282° C. by feeding hydrogen chloride gas (containing 19 ppb by volume of a sulfur component) at a rate of 80 ml/min (0.21 mol/h) and oxygen gas at a rate of 40 ml/min (0.11 mol/h). 1.5 Hours after initiation of the reaction, sampling was performed for 20 minutes by passing a gas at a reaction tube outlet through 30% by weight of an aqueous potassium iodide solution, and then a production rate (mol/h) of chlorine was determined by measuring the amount of chlorine produced using iodometry. From the rate of chlorine produced and the feed rate of hydrogen chloride, a conversion rate of hydrogen chloride was calculated by the equation shown below. The results were shown in Table 1.

Conversion ratio (%) of hydrogen chloride={production rate (mol/1) of chlorine×2/(feed rate (mol/h) of hydrogen chloride)}×100

Example 2

(a) Activation Treatment of Deteriorated Catalyst (Contact Treatment with Reducing Gas)

A nickel reaction tube having an inner diameter of 13 mm was filled with 1 g of the deteriorated catalyst of Reference Example 1(b) and then filled with 12 g of α-alumina spheres [SSA995 manufactured by NIKKATO CORPORATION] as a preheating layer at the gas inlet side of a catalyst layer. While feeding nitrogen gas at a rate of 80 ml/min, the reaction tube was immersed in a salt bath using a molten salt [potassium nitrate/sodium nitrite=1/1 (weight ratio)] as a heat medium, thereby adjusting the temperature of the catalyst layer to 350° C. Next, feed of the nitrogen gas was stopped, and carbon monoxide gas was fed at a rate of 3.2 ml/min (0.009 mol/h) and nitrogen gas was fed at a rate of 28.8 ml/min (0.08 mol/h) for 2 hours. (Contact treatment with oxidizing gas)

After the contact treatment with the reducing gas, feed of the carbon monoxide gas was stopped, and oxygen was fed at a rate of 40 ml/min (0.009 mol/h) and nitrogen gas was fed at a rate of 160 ml/min (0.43 mol/h), followed by maintaining at 350° C. for 2 hours.

(b) Evaluation of Activated Catalyst

After the contact treatment with the oxidizing gas (a), feed of the oxygen was stopped and nitrogen gas was fed at a rate of 80 ml/min (0.21 mol/h), and then the temperature of the catalyst layer was adjusted within a range from 281 to 282° C. Next, feed of the nitrogen gas was stopped and an oxidation reaction was performed at a catalyst layer temperature of 281 to 282° C. by feeding hydrogen chloride gas (containing 19 ppb by volume of a sulfur component) at a rate of 80 ml/min (0.21 mol/h) and oxygen gas at a rate of 40 ml/min (0.11 mol/h). 1.5 Hours after initiation of the reaction, sampling was performed for 20 minutes by passing a gas at a reaction tube outlet through 30% by weight of an aqueous potassium iodide solution, and then a production rate (mol/h) of chlorine was determined by measuring the amount of chlorine produced using iodometry. From the rate of chlorine produced and the feed rate of hydrogen chloride, a conversion rate of hydrogen chloride was calculated by the equation shown below. The results are shown in Table 1.

Example 3

(a) Activation Treatment of Deteriorated Catalyst

Under the same conditions as in Example 2(a), except that the temperature of a catalyst layer was adjusted to 300° C. in the contact treatment with the reducing gas of Example 2(a), an activation treatment of a catalyst was performed.

(b) Evaluation of Activated Catalyst

After the activation treatment (a), the activated catalyst was evaluated in the same manner as in Example 2(b). The results are shown in Table 1.

Example 4

(a) Activation Treatment of Deteriorated Catalyst

Under the same conditions as in Example 2(a), except that the temperature of a catalyst layer was adjusted to 400° C. in the contact treatment with the reducing gas of Example 2(a), an activation treatment of a catalyst was performed.

(b) Evaluation of Activated Catalyst

After the activation treatment (a), the activated catalyst was evaluated in the same manner as in Example 2(b). The results are shown in Table 1. After the evaluation, the catalyst was analyzed by ICP spectrometry. As a result, the sulfur content was 0.08% by weight.

Example 5

(a) Activation Treatment of Deteriorated Catalyst

Under the same conditions as in Example 2(a), except that the temperature of a catalyst layer was adjusted to 280° C. in the contact treatment with the oxidizing gas of Example 2(a), an activation treatment of a catalyst was performed.

(b) Evaluation of Activated Catalyst

After the activation treatment (a), the activated catalyst was evaluated in the same manner as in Example 2(b). The results are shown in Table 1. After the evaluation, the catalyst was analyzed by ICP spectrometry. As a result, the sulfur content was 0.12% by weight.

Example 6

(a) Activation Treatment of Deteriorated Catalyst

Under the same conditions as in Example 2(a), except that the temperature of a catalyst layer was adjusted to 300° C. in the contact treatment with the reducing gas of Example 2(a) and the temperature of a catalyst layer was adjusted to 400° C. in the contact treatment with the oxidizing gas of Example 2(a), an activation treatment of a catalyst was performed.

(b) Evaluation of Activated Catalyst

After the activation treatment (a), the activated catalyst was evaluated in the same manner as in Example 2(b). The results are shown in Table 1.

Example 7

(a) Activation Treatment of Deteriorated Catalyst

Under the same conditions as in Example 2(a), except that the temperature of a catalyst layer was adjusted to 400° C. in the contact treatment with the oxidizing gas of Example 2(a), an activation treatment of a catalyst was performed.

(b) Evaluation of Activated Catalyst

After the activation treatment (a), the activated catalyst was evaluated in the same manner as in Example 2(b). The results are shown in Table 1.

Example 8

(a) Activation Treatment of Deteriorated Catalyst

Under the same conditions as in Example 2(a), except that the temperature of a catalyst layer was adjusted to 400° C. in the contact treatment with the reducing gas of Example 2(a) and the temperature of a catalyst layer was adjusted to 400° C. in the contact treatment with the oxidizing gas of Example 2(a), an activation treatment of a catalyst was performed.

(b) Evaluation of Activated Catalyst

After the activation treatment (a), the activated catalyst was evaluated in the same manner as in Example 2(b). The results are shown in Table 1.

Example 9

(a) Activation Treatment of Deteriorated Catalyst (Contact Treatment with Reducing Gas)

A quartz reaction tube having an inner diameter of 14 mm was filled with 2.4 g of the deteriorated catalyst of Reference Example 1(b). While feeding nitrogen gas at a rate of 90 ml/min in the reaction tube, the temperature of a catalyst layer was adjusted to 350° C. in an electric furnace. Subsequently, while feeding the nitrogen gas at the same rate, hydrogen gas was fed at a rate of 10 ml/min (0.027 mol/h), followed by maintaining for 1.5 hours. After stopping feed of the hydrogen gas, the temperature was adjusted to 100° C. or lower while feeding the nitrogen gas, and the catalyst was withdrawn.

(Contact Treatment with Oxidizing Gas)

A nickel reaction tube having an inner diameter of 13 mm was filled with 1 g of the catalyst obtained by the above contact treatment with the reducing gas and then filled with 12 g of α-alumina spheres [SSA995 manufactured by NIKKATO CORPORATION] as a preheating layer at the gas inlet side of a catalyst layer. While feeding nitrogen gas at a rate of 80 ml/min in the reaction tube, the reaction tube was immersed in a salt bath using a molten salt [potassium nitrate/sodium nitrite=1/1 (weight ratio)] as a heat medium, thereby adjusting the temperature of the catalyst layer to 350° C. Next, oxygen was fed at a rate of 40 ml/min (0.009 mol/h) and nitrogen gas was fed at a rate of 160 ml/min (0.43 mol/h) for 2 hours.

(b) Evaluation of Activated Catalyst

After the activation treatment (a), the activated catalyst was evaluated in the same manner as in Example 2(b). The results are shown in Table 1.

Example 10

(a) Activation Treatment of Deteriorated Catalyst

Under the same conditions as in Example 9(a), except that the temperature of a catalyst layer was adjusted to 200° C. and the maintaining time was adjusted to 2 hours in the contact treatment with the reducing gas of Example 9(a), an activation treatment of a catalyst was performed.

(b) Evaluation of Activated Catalyst

After the activation treatment (a), the activated catalyst was evaluated in the same manner as in Example 2(b). The results are shown in Table 1.

Example 11

(a) Activation Treatment of Deteriorated Catalyst

Under the same conditions as in Example 9(a), except that the temperature of a catalyst layer was adjusted to 250° C. in the contact treatment with the reducing gas of Example 9(a), an activation treatment of a catalyst was performed.

(b) Evaluation of Activated Catalyst

After the activation treatment (a), the activated catalyst was evaluated in the same manner as in Example 2(b). The results are shown in Table 1. After the evaluation, the catalyst was analyzed by ICP spectrometry. As a result, the sulfur content was 0.09% by weight.

Example 12

(a) Activation Treatment of Deteriorated Catalyst

Under the same conditions as in Example 9(a), except that the temperature of a catalyst layer was adjusted to 400° C. in the contact treatment with the reducing gas of Example 9(a), an activation treatment of a catalyst was performed.

(b) Evaluation of Activated Catalyst

After the activation treatment (a), the activated catalyst was evaluated in the same manner as in Example 2(b). The results are shown in Table 1.

Example 13

(a) Activation Treatment of Deteriorated Catalyst

Under the same conditions as in Example 9(a), except that the temperature of a catalyst layer was adjusted to 400° C. in the contact treatment with the reducing gas of Example 9(a) and the temperature of a catalyst layer was adjusted to 400° C. in the contact treatment with the oxidizing gas of Example 9(a), an activation treatment of a catalyst was performed.

(b) Evaluation of Activated Catalyst

After the activation treatment (a), the activated catalyst was evaluated in the same manner as in Example 2(b). The results are shown in Table 1.

Comparative Example 1

(Evaluation of Deteriorated Catalyst: No Activation Treatment)

A nickel reaction tube having an inner diameter of 13 mm was filled with 1 g of the deteriorated catalyst of Reference Example 1(b) and then filled with 12 g of α-alumina spheres [SSA995 manufactured by NIKKATO CORPORATION] as a preheating layer at the gas inlet side of a catalyst layer. While feeding nitrogen gas at a rate of 80 ml/min in the reaction tube, the reaction tube was immersed in a salt bath using a molten salt [potassium nitrate/sodium nitrite=1/1 (weight ratio)] as a heat medium, thereby adjusting the temperature of the catalyst layer within a range from 281 to 282° C. After a lapse of 15 minutes, feed of the nitrogen gas was stopped and an oxidation reaction was performed at a catalyst layer temperature of 281 to 282° C. by feeding hydrogen chloride gas (containing 19 ppb by volume of a sulfur component) at a rate of 80 ml/min (0.21 mol/h) and oxygen gas at a rate of 40 ml/min (0.11 mol/h). 1.5 Hours after initiation of the reaction, sampling was performed in the same manner as in Example 2(b) and a production rate of chlorine was determined, and then a conversion rate of hydrogen chloride was calculated. The results are shown in Table 1.

Comparative Example 2

(Only Contact Treatment with Oxidizing Gas was Performed as Activation Treatment)

(a) Activation Treatment of Deteriorated Catalyst

A nickel reaction tube having an inner diameter of 13 mm was filled with 1 g of the deteriorated catalyst of Reference Example 1(b) and then filled with 12 g of α-alumina spheres [SSA995 manufactured by NIKKATO CORPORATION] as a preheating layer at the gas inlet side of a catalyst layer. While feeding nitrogen gas at a rate of 80 ml/min in the reaction tube, the reaction tube was immersed in a salt bath using a molten salt [potassium nitrate/sodium nitrite=1/1 (weight ratio)] as a heat medium, thereby raising the temperature of the catalyst layer to 350° C. Next, oxygen was fed at a rate of 40 ml/min (0.009 mol/h) and nitrogen gas was fed at a rate of 160 ml/min (0.43 mol/h) for 2 hours.

(b) Evaluation of Activated Catalyst

After the activation treatment (a), the activated catalyst was evaluated in the same manner as in Example 2(b). The results are shown in Table 1

Comparative Example 3

(Only Contact Treatment with Inert Gas was Performed as Activation Treatment)

(a) Activation Treatment of Deteriorated Catalyst

A nickel reaction tube having an inner diameter of 13 mm was filled with 1 g of the deteriorated catalyst of Reference Example 1(b) and then filled with 12 g of α-alumina spheres [SSA995 manufactured by NIKKATO CORPORATION] as a preheating layer at the gas inlet side of a catalyst layer. While feeding nitrogen gas at a rate of 80 ml/min in the reaction tube, the reaction tube was immersed in a salt bath using a molten salt [potassium nitrate/sodium nitrite=1/1 (weight ratio)] as a heat medium, thereby adjusting the temperature of the catalyst layer to 350° C. for 2 hours.

(b) Evaluation of Activated Catalyst

After the activation treatment (a), nitrogen was fed at a rate of 80 ml/min (0.21 mol/h) and the temperature of the catalyst layer was adjusted within a range from 281 to 282° C. Next, feed of the nitrogen gas was stopped and an oxidation reaction was performed at a catalyst layer temperature of 281 to 282° C. by feeding hydrogen chloride gas (containing 19 ppb by volume of a sulfur component) at a rate of 80 ml/min (0.21 mol/h) and oxygen gas at a rate of 40 ml/min (0.11 mol/h). 1.5 Hours after initiation of the reaction, sampling was performed in the same manner as in Example 2(b) and a production rate of chlorine was determined, and then a conversion rate of hydrogen chloride was calculated. The results are shown in Table 1.

TABLE 1

| Treatment | Contact treatment with reducing gas | | | Contact treatment with oxidizing gas | | | Conversion ratio of hydrogen chloride (%) |
| --- | --- | --- | --- | --- | --- | --- | --- |
| | Composition of contacting gas | Contact temperature (° C.) | Contact time (h) | Composition of contacting gas | Contact temperature (° C.) | Contact time (h) | |
| Example 1 | CO/N$_2$ | 350 | 2 | None | | | 2.2 |
| Example 2 | CO/N$_2$ | 350 | 2 | O$_2$/N$_2$ | 350 | 2 | 3.4 |
| Example 3 | CO/N$_2$ | 300 | 2 | O$_2$/N$_2$ | 350 | 2 | 2.8 |
| Example 4 | CO/N$_2$ | 400 | 2 | O$_2$/N$_2$ | 350 | 2 | 3.3 |
| Example 5 | CO/N$_2$ | 350 | 2 | O$_2$/N$_2$ | 280 | 2 | 2.6 |
| Example 6 | CO/N$_2$ | 300 | 2 | O$_2$/N$_2$ | 400 | 2 | 2.9 |
| Example 7 | CO/N$_2$ | 350 | 2 | O$_2$/N$_2$ | 400 | 2 | 3.9 |
| Example 8 | CO/N$_2$ | 400 | 2 | O$_2$/N$_2$ | 400 | 2 | 3.9 |
| Example 9 | H$_2$/N$_2$ | 350 | 1.5 | O$_2$/N$_2$ | 350 | 2 | 2.8 |
| Example 10 | H$_2$/N$_2$ | 200 | 2 | O$_2$/N$_2$ | 350 | 2 | 2.2 |
| Example 11 | H$_2$/N$_2$ | 250 | 1.5 | O$_2$/N$_2$ | 350 | 2 | 2.7 |
| Example 12 | H$_2$/N$_2$ | 400 | 1.5 | O$_2$/N$_2$ | 350 | 2 | 2.6 |
| Example 13 | H$_2$/N$_2$ | 400 | 1.5 | O$_2$/N$_2$ | 400 | 2 | 4.4 |
| Comparative Example 1 | None | | | None | | | 1.6 |
| Comparative Example 2 | None | | | O$_2$/N$_2$ | 350 | 2 | 1.6 |
| Comparative Example 3 | None | | | Contact treatment with inert gas N$_2$ only | 350 | 2 | 1.5 |

Example 14

(a) Activation Treatment of Deteriorated Catalyst (Contact Treatment with Water)

5 g of the deteriorated catalyst of Reference Example 1(b) and 50 g of ion-exchange water were charged in a vessel, mixed and allowed to stand at 25° C. for 14 hours, and then the supernatant was removed by decantation. Next, the same operation as described above was repeated twice, except that the standing time was adjusted to 20 and 94 hours, drying was performed at 60° C. for 2 hours to obtain a water-treated catalyst.

(Contact Treatment with Reducing Gas)

A nickel reaction tube having an inner diameter of 13 mm was filled with 1 g of the water-treated catalyst obtained above and then filled with 12 g of α-alumina spheres [SSA995 manufactured by NIKKATO CORPORATION] as a preheating layer at the gas inlet side of a catalyst layer. While feeding nitrogen gas at a rate of 80 ml/min in the reaction tube, the reaction tube was immersed in a salt bath using a molten salt [potassium nitrate/sodium nitrite=1/1 (weight ratio)] as a heat medium, thereby adjusting the temperature of the catalyst layer to 350° C. Next, feed of the nitrogen gas was stopped, and carbon monoxide gas was fed at a rate of 3.2 ml/min (0.009 mol/h) and nitrogen gas was fed at a rate of 28.8 ml/min (0.08 mol/h) for 2 hours.

(Contact Treatment with Oxidizing Gas)

After the contact treatment with the reducing gas, feed of the carbon monoxide gas was stopped, and oxygen was fed at a rate of 40 ml/min (0.009 mol/h) and nitrogen gas was fed at a rate of 160 ml/min (0.43 mol/h), followed by maintaining at 400° C. for 2 hours.

(b) Evaluation of Activated Catalyst

After the activation treatment (a), the activated catalyst was evaluated in the same manner as in Example 2(b). The results are shown in Table 2.

Comparative Example 4

(Only Contact Treatment with Water was Performed as Activation Treatment)

A nickel reaction tube having an inner diameter of 13 mm was filled with 1 g of the water-treated catalyst of Example 14(a) and then filled with 12 g of α-alumina spheres [SSA995 manufactured by NIKKATO CORPORATION] as a preheating layer at the gas inlet side of a catalyst layer. While feeding nitrogen gas at a rate of 80 ml/min in the reaction tube, the reaction tube was immersed in a salt bath using a molten salt [potassium nitrate/sodium nitrite=1/1 (weight ratio)] as a heat medium, thereby adjusting the temperature of the catalyst layer within a range from 281 to 282° C. Next, feed of the nitrogen gas was stopped and an oxidation reaction was performed at a catalyst layer temperature of 281 to 282° C. by feeding hydrogen chloride gas (containing 19 ppb by volume of a sulfur component) at a rate of 80 ml/min (0.21 mol/h) and oxygen gas at a rate of 40 ml/min (0.11 mol/h). 1.5 Hours after initiation of the reaction, sampling was performed in the same manner as in Example 2(b) and a production rate of chlorine was determined, and then a conversion rate of hydrogen chloride was calculated. The results are shown in Table 2.

TABLE 2

| Treatment | Contact treatment with water | Contact treatment with reducing gas | | | Contact treatment with oxidizing gas | | | Conversion ratio of hydrogen chloride (%) |
| --- | --- | --- | --- | --- | --- | --- | --- | --- |
| | | Composition of reducing gas | Contact temperature (° C.) | Contact time (h) | Composition of reducing gas | Contact temperature (° C.) | Contact time (h) | |
| Example 14 | performed | CO/N$_2$ | 350 | 2 | O$_2$/N$_2$ | 400 | 2 | 5.2 |
| Comparative Example 4 | performed | None | | | None | | | 1.7 |

The invention claimed is:

1. A method for producing chlorine comprising the steps of:
   (a) treating a deteriorated catalyst by contacting the deteriorated catalyst with a reducing gas containing carbon monoxide and/or hydrogen, and thereafter contacting the deteriorated catalyst with an oxygen-containing gas, and
   (b) subsequently oxidizing hydrogen chloride with oxygen in the presence of the deteriorated catalyst treated in step (a),
   wherein the catalyst is a chromium catalyst or a supported ruthenium oxide in which ruthenium oxide is supported on a carrier.

2. The method according to claim 1, wherein the deteriorated catalyst is treated by contacting with water, and thereafter treated by an oxygen-containing gas.

3. The method according to claim 1, wherein the deteriorated catalyst is treated by contacting with the reducing gas, and thereafter treated by contacting with water, and thereafter treated by an oxygen-containing gas.

4. The method according to claim 1, wherein the deteriorated catalyst is treated by contacting with the reducing gas, thereafter treated by contacting with an oxygen-containing gas and then treated by contacting with water.

5. The method according to claim 1, wherein the temperature of contacting with the reducing gas is from 150 to 450° C.

6. The method according to claim 2, wherein the temperature of contacting with the oxygen-containing gas is from 250 to 450° C.

* * * * *